(12) United States Patent
Balakrishnan

(10) Patent No.: US 10,581,351 B2
(45) Date of Patent: Mar. 3, 2020

(54) METHOD TO REDUCE THE COMMUTATION LOSS IN A MOTOR INVERTER

(71) Applicant: TEXAS INSTRUMENTS INCORPORATED, Dallas, TX (US)

(72) Inventor: Manu Balakrishnan, Kollam (IN)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 0 days.

(21) Appl. No.: 15/972,688

(22) Filed: May 7, 2018

(65) Prior Publication Data

US 2019/0229655 A1 Jul. 25, 2019

(30) Foreign Application Priority Data

Jan. 24, 2018 (IN) .............................. 201841002787

(51) Int. Cl.
  *H02P 6/28* (2016.01)
  *H02P 6/16* (2016.01)
  *H01F 13/00* (2006.01)

(52) U.S. Cl.
  CPC .............. *H02P 6/28* (2016.02); *H01F 13/006* (2013.01); *H02P 6/16* (2013.01)

(58) Field of Classification Search
  CPC .... H02P 6/26; H02P 6/85; H02P 6/153; H02P 5/68; H02P 27/08; H02P 29/026; H02H 7/53871
  See application file for complete search history.

(56) References Cited

U.S. PATENT DOCUMENTS

| | | | | |
|---|---|---|---|---|
| 5,475,290 A * | 12/1995 | Tani | ...................... | D06F 37/304 318/434 |
| 6,005,316 A * | 12/1999 | Harris | .................. | F16C 32/0457 310/90.5 |
| 6,747,432 B2 * | 6/2004 | Yoshimura | .............. | F01P 7/048 318/599 |
| 8,134,327 B2 * | 3/2012 | Forte | .................. | H02M 7/53871 318/599 |
| 8,350,508 B2 * | 1/2013 | Celik | ........................ | A47L 5/26 318/400.01 |
| 2009/0284194 A1 * | 11/2009 | Forte | .................. | H02M 7/53871 318/400.02 |
| 2011/0015788 A1 * | 1/2011 | Celik | ........................ | H02P 6/14 700/275 |
| 2011/0248657 A1 * | 10/2011 | Endoh | .................. | B62D 5/0487 318/400.22 |

* cited by examiner

*Primary Examiner* — Rina I Duda
(74) *Attorney, Agent, or Firm* — Ray A. King; Charles A. Brill; Frank D. Cimino

(57) ABSTRACT

A circuit comprises a multiphase gate driver to be coupled to a multiphase inverter for driving a multiphase motor. For each phase, the multi-phase gate driver is to, in accordance with a pulse width modulation (PWM) control signal, turn on and off a high side transistor of a given pair of high and low side transistors of the multiphase inverter, discontinue the PWM control signal turn to the high side transistor of the given pair and turn off the high side transistor of the given pair, and turn on the low side transistor of the given pair until a current level through the low side transistor falls below a threshold, at which time, turn off the low side transistor.

13 Claims, 9 Drawing Sheets

| | Q1 | Q2 | Q3 | Q4 | Q5 | Q6 | DURATION OF CONDUCTION |
|---|---|---|---|---|---|---|---|
| | PWM | !PWM | OFF | ON | OFF | OFF | 60° ELECTRICAL - DEMAGNETIZATION PERIOD |
| 802 | OFF | ON | OFF | ON | PWM | !PWM | DEMAGNETIZATION PERIOD |
| | OFF | OFF | OFF | ON | PWM | !PWM | 60° ELECTRICAL - DEMAGNETIZATION PERIOD |
| 802 | OFF | ON | ON | OFF | PWM | !PWM | DEMAGNETIZATION PERIOD |
| | OFF | ON | OFF | OFF | PWM | !PWM | 60° ELECTRICAL - DEMAGNETIZATION PERIOD |
| 802 | OFF | ON | PWM | !PWM | OFF | ON | DEMAGNETIZATION PERIOD |
| | OFF | ON | PWM | !PWM | OFF | OFF | 60° ELECTRICAL - DEMAGNETIZATION PERIOD |
| 802 | ON | OFF | PWM | !PWM | OFF | ON | DEMAGNETIZATION PERIOD |
| | OFF | OFF | PWM | !PWM | OFF | ON | 60° ELECTRICAL - DEMAGNETIZATION PERIOD |
| 802 | PWM | !PWM | OFF | ON | OFF | ON | DEMAGNETIZATION PERIOD |
| | PWM | !PWM | OFF | OFF | OFF | ON | 60° ELECTRICAL - DEMAGNETIZATION PERIOD |
| 802 | PWM | !PWM | OFF | ON | ON | OFF | DEMAGNETIZATION PERIOD |

FIG. 8

METHOD TO REDUCE THE COMMUTATION LOSS IN A MOTOR INVERTER

CROSS-REFERENCE TO RELATED APPLICATIONS

The present application claims priority to Indian Provisional Patent Application No. 201841002787, filed Jan. 24, 2018, titled "A Method to Reduce the Commutation Loss in a Brushless Motor Inverter," which is hereby incorporated herein by reference in its entirety.

BACKGROUND

A motor is driven electrically by a motor driver circuit ("motor driver"). A motor driver includes gate drivers and a power stage. The power stage comprises one or more power transistors which provide current to the windings of the motor, Efficiency is a concern in motor drive circuits. The efficiency of the motor driver depends on losses in the power transistors of the power stage and the gate drivers. Various control algorithms are employed and some control algorithms are less efficient than other control algorithms.

SUMMARY

In one example, a circuit comprises a multiphase gate driver to be coupled to a multiphase inverter for driving a multiphase motor. For each phase, the multi-phase gate driver is to, in accordance with a pulse width modulation (PWM) control signal, turn on and off a high side transistor of a given pair of high and low side transistors of the multiphase inverter, discontinue the PWM control signal turn to the high side transistor of the given pair and turn off the high side transistor of the given pair, and turn on the low side transistor of the given pair until a current level through the low side transistor falls below a threshold, at which time, turn off the low side transistor.

In yet another example, a method for controlling a multiphase motor that includes a plurality of windings comprises, for a given pair of power transistors among a plurality of pairs of power transistors, each pair comprising a high side transistor connected to a low side transistor, turning on and off the high side transistor of the given pair in accordance with a pulse width modulated (PWM) control signal. The method then includes, while turning on and off the high side transistor of the given pair, sequentially turning on the low side transistor of each of the other pairs of power transistors while turning off all other low side transistors. The method further includes turning off the high side transistor of the given pair, turning on the low side transistor of the given pair, determining that current through the low side transistor of the given pair falls below a threshold indicative that energy has dissipated in a winding of the multiphase motor, and, responsive to the determination that the current has falling below the threshold, turning off the low side transistor of the given pair.

BRIEF DESCRIPTION OF THE DRAWINGS

For a detailed description of various examples, reference will now be made to the accompanying drawings in which:

FIG. 8 shows another table of possible operational states of the transistors comprising the multiphase inverter in accordance with an example.

DETAILED DESCRIPTION

As noted above, one of the sources of inefficiency in motor drivers is related to the power switches. Power transistors exhibit diode losses, conduction losses, and switching losses. Diode losses occur during a cycle of operation of the motor in which the energy stored in a given motor winding is permitted to be dissipated back through the motor driver and specifically through the body diodes of the power transistors as "free wheeling" current. The disclosed examples pertain to a motor controller for driving a multiphase motor (e.g., a brushless direct current (DC) motor, a permanent magnet synchronous motor, etc.). The multiphase motor described herein also may be referred to as an N-phase motor, where N refers to the number of phases of the motor. The disclosed motor controller employs active demagnetization to reduce inefficiencies otherwise caused by diode losses. Instead of permitting free wheeling current to flow from a demagnetizing motor winding through a transistor's body diode, a power transistor, which otherwise would have been off, is turned on to provide a conductive path for the current from the motor winding. The transistor is turned on just long enough to allow the energy stored in the winding to be dissipated, at which time the transistor is turned off. The same process occurs with respect to each of the motor's windings.

Figures 1, 3:
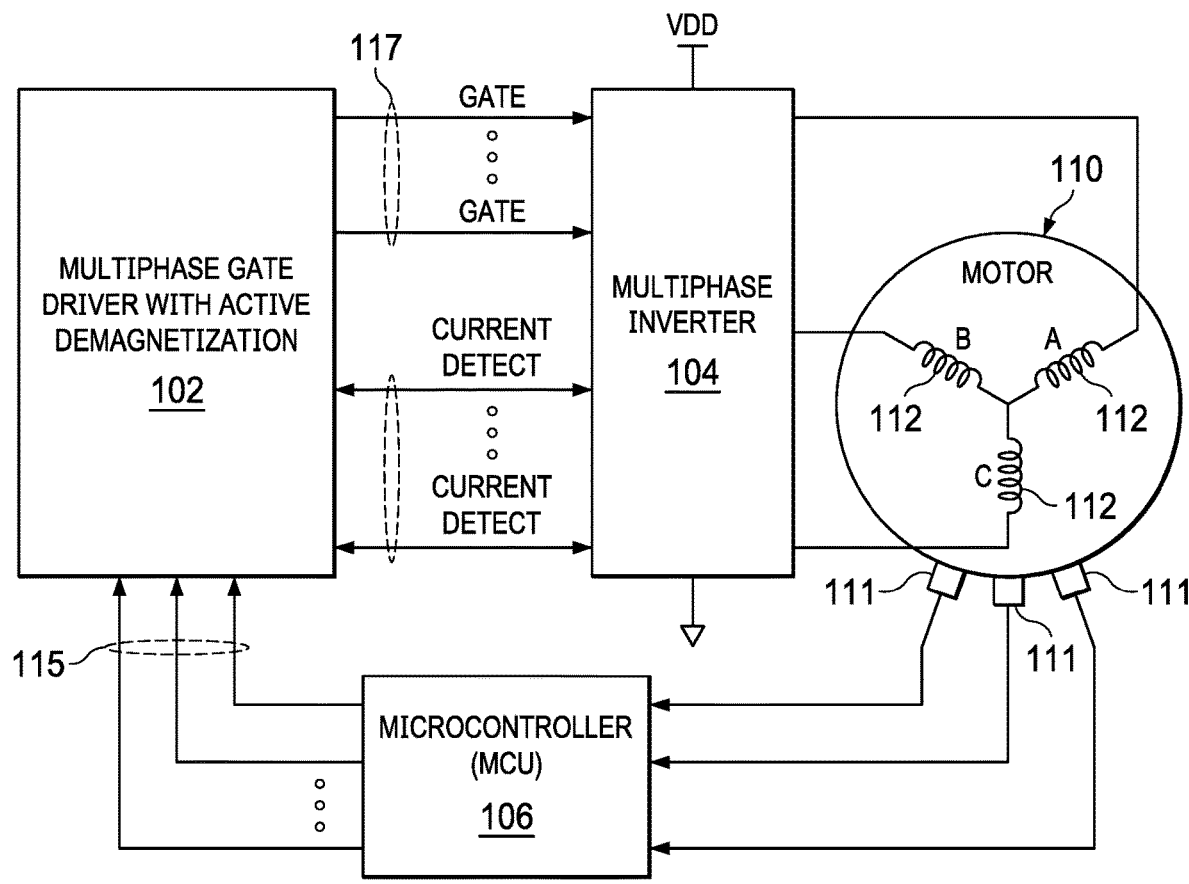
FIG. 1 illustrates a system for driving a multiphase motor employing active demagnetization of the motor's windings in accordance with an example.
FIG. 3 shows a table of possible operational states of the transistors comprising the multiphase inverter in accordance with an example.

FIG. 1 shows an example of a multiphase gate driver with active demagnetization (also termed "gate driver") 102, a multiphase inverter 104 (also termed "inverter"), a multiphase motor 110 and a microcontroller 106. The multiphase motor 110 in this example is a 3-phase motor, but can have other than 3 phases in other examples. The multiphase motor includes three windings 112 as shown (labeled A, B, and C) and which are driven by the multiphase inverter 104. The multiphase inverter 104 includes multiple power transistors (shown in other figures). Under control from digital control signals 115 from the microcontroller 106 (also termed an "MCU"), the gate driver 102 generates gate signals (GATE) 117 at appropriate voltages to turn on and off the various power transistors within the multiphase inverter 104. Position sensors 111 within the motor 110 provide feedback signals to the MCU 106 to indicate the position of the motor's rotor. Based on the control algorithm employed for driving the motor 110 and based on the feedback signals from the position sensors 111, the MCU 106 generates the digital control signals 115 to the gate driver 102 to sequence the power transistors within the multiphase inverter 104 appropriately to turn the motor.

Figure 2:
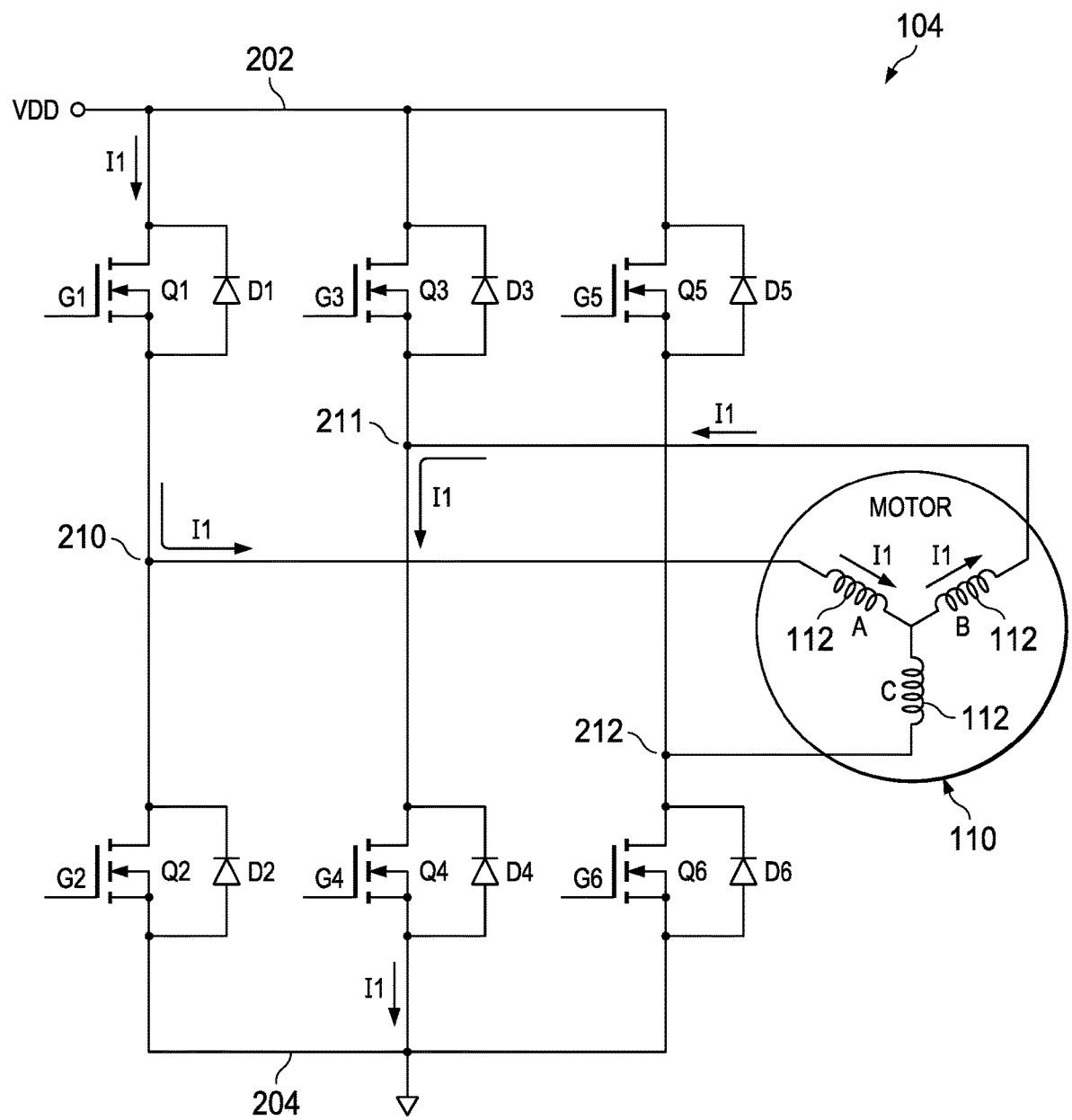
FIG. 2 illustrates a multiphase inverter usable in the system of FIG. 1.

FIG. 2 shows an example of the multiphase inverter 104 coupled to the multiphase motor 110. In this example, the multiphase motor 110 is a 3-phase motor and the multiphase inverter 104 is a 3-phase inverter. The inverter 104 comprises three pairs of transistors. One pair comprises Q1 and Q2. Another pair comprises Q3 and Q4, and a third pair comprises Q5 and Q6. The transistors Q1-Q6 in this example comprise n-type metal oxide semiconductor field effect transistors (NMOS), but can include other types of transistors in other examples (e.g., p-type metal oxide semiconductor field effect transistors (PMOS), n-type or p-type bipolar junction transistors, etc.). Transistors Q1, Q3, and Q5 are referred to as high side transistors and Q2, Q4, and Q6 are referred to as low side transistors.

In the example of FIG. 2, the drains of Q1, Q3, and Q5 connected to a positive power supply node 202 (VDD) and the sources of Q2, Q4, and Q6 are connected to a ground node 204. The source of Q1 connects to the drain of Q2 at node 210. Similarly, the source of Q3 connects to the drain of Q4 at node 211, and the source of Q5 connects to the drain of Q6 at node 212. The windings A, B, and C of the motor 110 couple to the respective nodes 210-212. Winding A is connected to node 210 of transistor pair Q1/Q2. Winding B is connected to node 211 of transistor pair Q3/Q4. Winding C is connected to node 212 of transistor pair Q5/Q6. The body diodes of transistors Q1-Q6 also are illustrated in FIG. 2 as D1-D6.

In one example, the control algorithm embodied in the MCU 106 is a trapezoidal control algorithm, but other control algorithms can be used as well. All functionality described herein attributable to the MCU 106 (e.g., the control algorithm) is implemented through execution by the MCU of machine instructions (e.g., firmware) stored in a non-transitory storage device within or coupled to the MCU.

Implementing a trapezoidal control algorithm, the MCU 106 asserts digital control signal 115 to cause the gate driver 102 to generate appropriate gate signals 117 to the various power transistors Q1-Q6. In FIG. 2, the gate signal for each of Q1 through Q6 is shown as G1 through G6, respectively. The transistors of a given connected pair of transistors are never both turned on simultaneously. For example, if Q1 is on, Q2 is off. Q1 and Q2 can both be off at the same time, but not both on at the same time to avoid a short circuit condition between VDD and ground.

In accordance with a trapezoidal control algorithm, the MCU 106 causes the power transistors to be sequenced on as follows. Q1 and Q4 are turned on which permits current 11 to flow from VDD, through Q1 to node 210, through winding A, winding B, and via node 211 through Q4 to ground. Then, with Q1 still on, Q4 is turned off and Q6 is turned on. The current path at this point includes Q1, winding A, winding C, and Q6 to ground. Then, Q1 is turned off and Q3 is turned on (while Q6 remains on). The current path then becomes VDD, Q3, node 211, winding B, winding C, and Q6. Then, Q6 is turned off and Q2 is turned on resulting in the current path Q3, node 211, winding B, winding A, node 210 and Q2 to ground. Then, Q3 is turned off and Q5 is turned on (with Q2 remaining on). The current path then becomes VDD, Q5, winding C, winding A, node 210, and Q2. Q2 is then turned off and Q4 is turned on resulting in the current path Q5, winding C, winding B, node 211 and Q4 to ground. As such, while a high side transistor of a given high/low side transistor pair is on, then sequentially the low side transistors of the other high/low side transistor pairs are turned on.

In some implementations, the MCU 106 implements pulse width modulation (PWM) of its digital control signals 115, which in turn causes the gate driver 102 to toggle on and off the high side transistors Q1, Q3, and Q5 in accordance with the PWM digital control signals 115 from the MCU. For example, when Q1 and Q4 are on, in some cases, Q1 is toggled on and off according to a PWM scheme implemented by the MCU 106. In this case, while Q1 is toggled on and off during its active phase, Q4 is maintained on continuously. The high side transistors Q1, Q3 and Q5 are turned on/off according to PWM-based gate signals G1, G3, and G5.

When one of the high side transistors Q1, Q3, and Q5 are toggled on and off per the PWM scheme implemented by the MCU 106, the corresponding low side transistor is toggled on and off as well per the PWM scheme of its high side transistor counterpart but in a reciprocal fashion. For example, when Q1 is toggled on and off per a PWM G1 gate signal, Q2 is turned off when Q1 is on, and on when Q1 is off. Thus, the G2 gate signal to Q2 is the logical inverse of the G1 gate signal to Q1.

FIG. 3 includes a table illustrating one complete cycle of operation of the multiphase inverter 104. Each row 300 in the table corresponds to one state of the transistors Q1-Q6. A transistor being off is designated as OFF and a transistor being on continuously is designated as ON. A high side transistor being pulsed on and off per a PWM gate control signal is designated as PWM. A low side transistor being pulsed on and off with a gate control signal that is the logical inverse of its high side counterpart is designated as !PWM (the exclamation point designates the logical inverse of the signal). The column labeled "Duration of Conduction" refers to the portion of one complete 360 degree cycle of operation of the multiphase inverter 104. As three high side transistors Q1, Q3, and Q5 are present in the 3-phase example of FIG. 2, then each of the high side transistors are on for 120 degrees of the cycle-60 degrees of which is for one low side transistor being on and another 60 degrees is for another low side transistor being. Reference numeral 302 identifies that for 120 degrees of the cycle, high side transistor Q5 is actively operated per a PWM control signal while first low side transistor Q4 is on and then low side transistor Q2 is on. Reference numeral 304 identifies that for 120 degrees of the cycle, high side transistor Q3 is actively operated per a PWM control signal while first low side transistor Q2 is on and then low side transistor Q6 is on. Reference numeral 306 identifies that for 120 degrees of the cycle, high side transistor Q1 is actively operated per a PWM control signal while first low side transistor Q6 is on and then low side transistor Q4 is on.

Current that flows into the motor windings causes energy to be stored in the windings. That energy is subsequently removed from the windings so that additional energy can be stored therein during the operation of the motor. Freewheeling current from the windings can flow through the body diodes of the transistors but that would result in electrical power being consumed by the body diodes themselves thereby increasing inefficiency in the multiphase inverter's operation. In accordance with the disclosed embodiments, the multiphase gate driver with active demagnetization 102 turns on certain of the transistors Q1-Q6 during each cycle so that current from a winding to be demagnetized can flow through the transistors from source to drain rather than through the body diodes.

Figure 4:
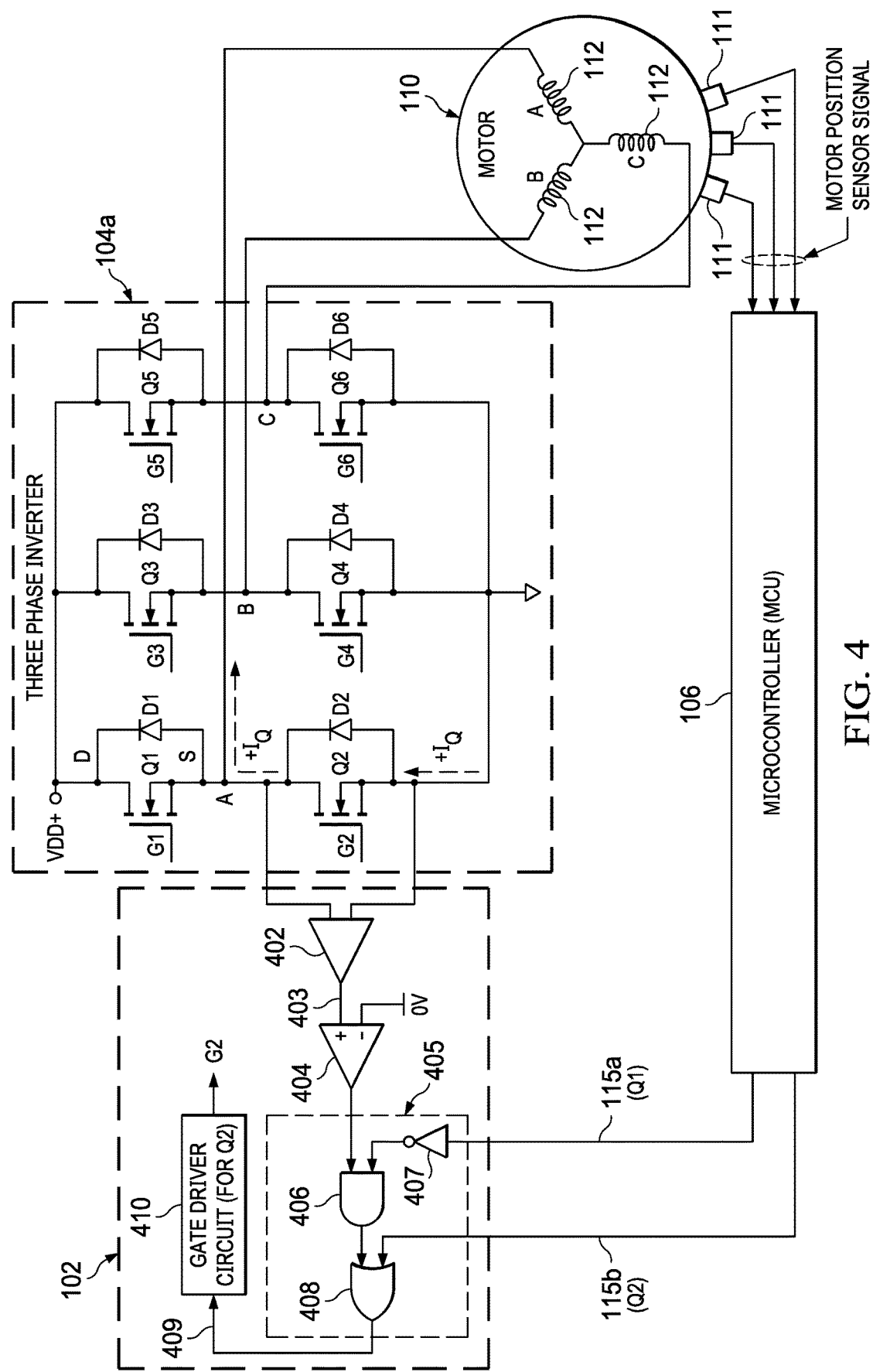
FIG. 4 shows an example of at least a portion of a multiphase gate driver with active demagnetization in accordance with an example.

FIG. 4 shows an example of the multiphase gate driver with active demagnetization 102 coupled to a three phase inverter 104a. The example gate driver 102 shown in FIG. 4 includes circuitry usable to control the gate signal G2 for low side transistor Q2. The other low side transistors Q4 and Q6 have similar circuitry. The gate driver 102 includes an amplifier 402 (or other type of current sense device, to detect the current through Q2), a comparator 404, logic gates 405, and gate driver circuit 410. The gate driver circuit 410 includes one or more transistors configured to level shift the input voltage 409 to a suitable voltage to drive the gate of Q2.

The amplifier 402 generates a voltage proportional to the source-to-drain voltage across Q2. When Q2 is on and conducting source-to-drain current, the source-to-drain voltage of Q2 is non-zero and is more than zero (i.e., positive). When Q2 is on and if the source-to-drain current is zero, the source to drain voltage is zero. However, when Q2 is off the source-to-drain voltage becomes less than zero and the amplifier output will be clamped at zero. The output signal 403 from amplifier 402 thus is indicative of whether current is flowing through Q2. The output signal 403 is a voltage greater than 0 if current is flowing through Q2 from source to drain and 0V if no current is flowing through Q2.

The comparator 404 is a voltage comparator in this example and has a positive (+) input and a negative (−) input. The positive input is coupled to the output of the amplifier 402 and the negative input receives a 0V reference voltage. Thus, the comparator 404 compares the output signal 403 from the amplifier to 0V and outputs a logic high if the output signal 403 is greater than 0V and a logic low otherwise. As such, the comparator's output indicates whether current is flowing through Q2—logic high indicates the flow of current through Q2 from source to drain and logic low indicates no current through Q2.

The logic gates 405 in this example include an AND gate 406, an OR gate 408, and a NOT gate 407 (referred to herein as a NOT gate instead of an inverter to avoid confusion with respect to multiphase inverter 104). Other combinations of logic gates are possible as well. The AND gate includes two inputs and one input is coupled to the output of the comparator 404. The other input is coupled to the output of the NOT gate 407. The output of AND gate 407 is coupled to one input of OR gate 408.

In addition to the source-to-drain voltage across Q2 being an input to the driver 102, digital control signals 115a and 115b from the MCU 106 are also provided as inputs. Digital control signals 115a and 115b are the PWM control signals generated by the MCU 106 for Q1 and Q2, respectively. Digital control signal 115a of course is also supplied to a similar circuit within gate driver 102 that controls the operation of Q1. As explained above, digital control signals 115a and 115b are logical inverses of each other (i.e., when 115a is high, 115b is low, and vice versa) or both 115a and 155b are zero. Digital control signal 115a is provided to the input of NOT gate 407 and digital control signal 115b is provided to an input of OR gate 408. The output of OR gate 408 comprises a signal 409 which is provided to the gate driver circuit 410 for Q2.

The gate driver circuit 410 asserts G2 to turn on Q2 based on its input signal 409. The input signal 409 is asserted high when either digital control signal 115b is asserted high (to thereby toggle Q2 on and off in accordance with its PWM digital control signal 115b) or when the output of AND gate 406 is high. The output of AND gate 406 will be high when both of its inputs are high. One input is the output of comparator 404, which will be high when current is flowing through Q2 from source to drain. The other input of the AND gate 404 is high when the digital control signal 115a is a logic low.

Figure 5:
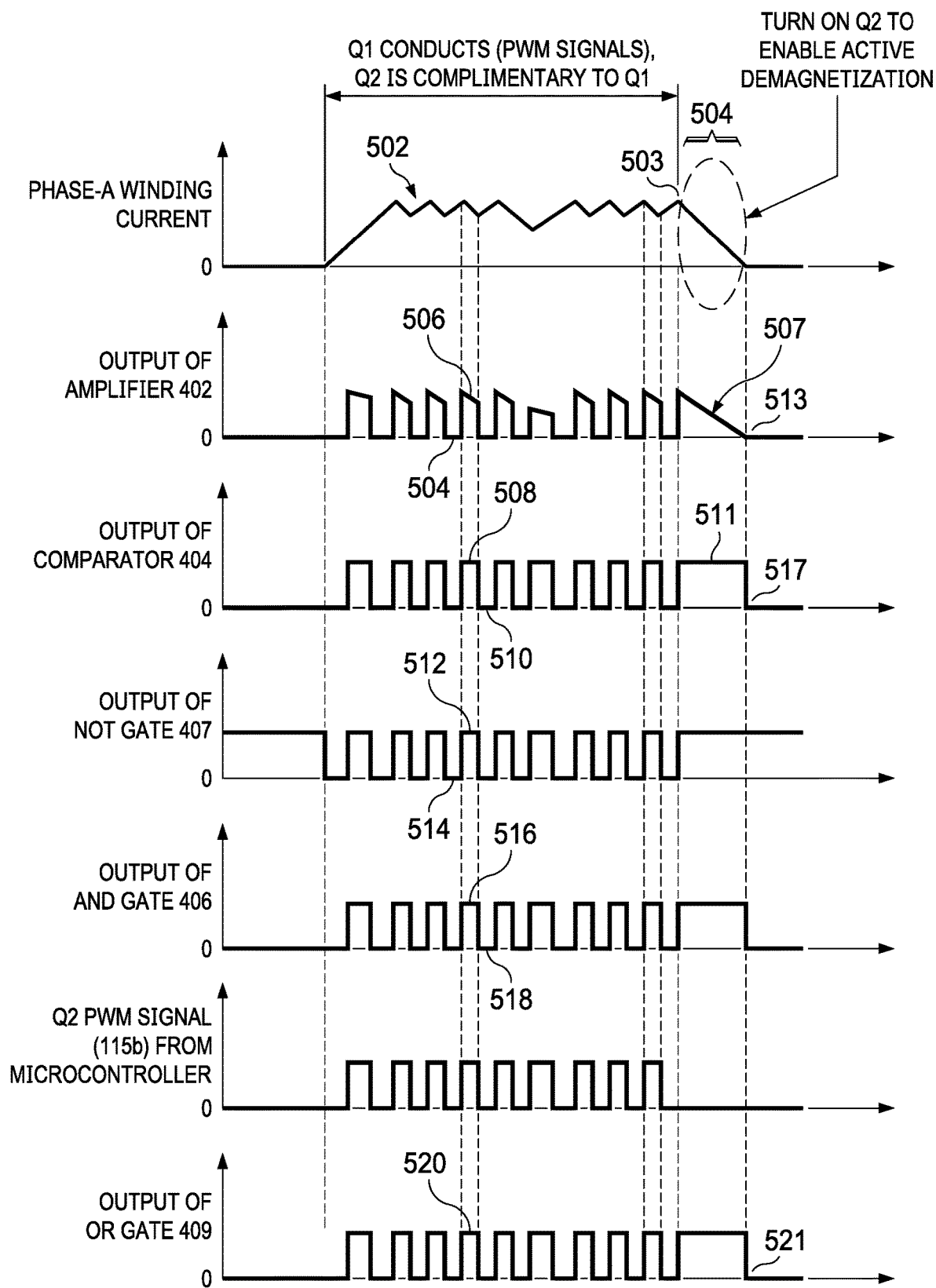
FIG. 5 shows a timing diagram pertaining to the example of FIG. 4.

FIG. 5 provides a timing diagram to illustrate the operation of the gate driver 102 for controlling low side transistor Q2. The signals shown include the phase A winding current (i.e., the current through winding A of the motor 110), the output of the amplifier 402, the output of the comparator 404, the output of the NOT gate 407, the output of AND gate 406, the Q2 PWM signal (digital control signal 115b), and the output of OR gate 409. The signals are depicted during the cycle of operation of the motor in which Q1 is actively turned on and off in accordance with a PWM digital control signal 115a, and as explained above sequentially low side transistors Q4 and Q6 are turned off.

The ripple 502 results from Q1 being repeatedly turned on and then off in accordance with its PWM digital control signal 115a. When Q1 is turned off, Q2 is turned on and when Q1 is turned on, Q2 is turned off as explained above and represented in the table of FIG. 3). As such, the current through Q1 and hence the motor phase-A winding current increases linearly when Q1 is on and decreases when Q1 is off and Q2 is on. When Q1 is on and Q2 is off, no current flows through Q2 and thus the output of amplifier 402 is zero as shown at 504. When Q1 is off and Q2 is on, current flows through Q2 (from source to drain) instead of through Q1 as indicated at 506. The comparator 404 compares the amplifier's output to zero and generates a logic high output when current flows through Q2 as indicated at 508 and a logic low output when no current flows through Q2 as indicated at 510.

The output of NOT gate 407 is logic high (512) when Q1 is off and logic low (514) when Q1 is on. The output of AND gate 406 also is shown and is logic high (516) when both the NOT gate's output is logic high and the comparator's output is logic high. The output of OR gate 409 is logic high (520), as noted above, when either the AND gate output is high or the PWM digital control signal 115b for Q2 is logic high.

When the MCU 106 discontinues active assertion of the PWM digital control signal at 503, to being active assertion of the PWM digital control signal 115 for another high side transistor (e.g., Q3 or Q5), the digital control signal 115a (for Q1) is low which cause the NOT gate 407 to provide a logic high to one input of AND gate 406. At 503, Q1 is turned off. As Q1 turns off, the diode across Q2 starts conducting creating a positive voltage across the source to drain of Q2, which further makes the comparator output high, and as the output of NOT gate 407 is high at 503, the output of AND gate 406 is high, which makes the output of OR gate 408 high and Q2 thus turns on. Current flows through Q2 as Q2 is on due to G2 being at a suitable voltage to turn on Q2. The current flow through Q2 during 504 is sourced by winding A. The energy stored in winding A decreases and thus the current through winding A decreases as is indicated at 507 by the falling output of amplifier 402. While the output of amplifier 402 remains above 0 V, the output of comparator 404 is high as shown at 511. With both the comparator's and the NOT gate's output being high, both inputs to AND gate 406 are high and thus the output of the AND gate is high which, via OR gate 408, causes G2 to continue to be asserted high to maintain Q2 in an on state.

Once the current through Q2 falls to zero (which occurs when the energy in winding A is depleted), the output of amplifier 402 falls to zero as indicated at 513. In response to the amplifier's output being zero, the output of the comparator 404 becomes logic low as indicated at 517. With the comparator's output being logic low, the output of AND gate 406 becomes logic low and because digital control signal 115b (PWM control signal for Q2) is low, the output of OR gate 409 becomes low as well (521). Q2 is thereby turned off as winding A has been sufficiently demagnetized.

Figure 6:
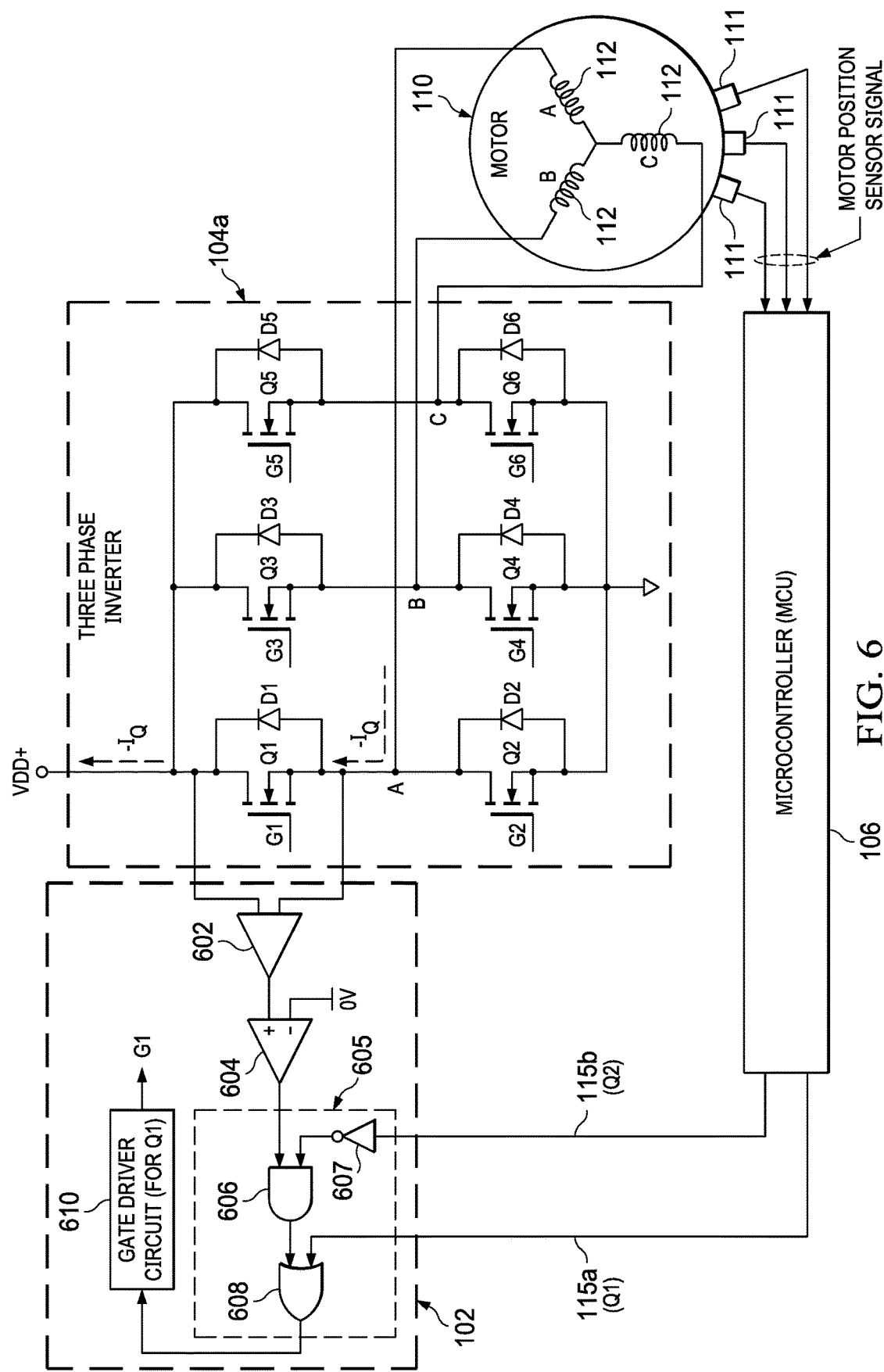
FIG. 6 shows an example of another portion of the multiphase gate driver with active demagnetization in accordance with an example.

In some implementations, the circuit shown in FIG. 4 is replicated for each of the low side transistors Q2, Q4, and Q6. FIG. 6 illustrates the circuit within driver 102 for controlling the operation of each of the high side transistors Q1, Q3, Q5 to perform active demagnetization. The circuit includes an amplifier 602, a comparator 604, logic gates 605 (including AND gate 606, NOT gate 607, and OR gate 608) and gate driver circuit 610 to drive Q1. The circuit in this example is largely the same as in FIG. 4.

Figure 7:
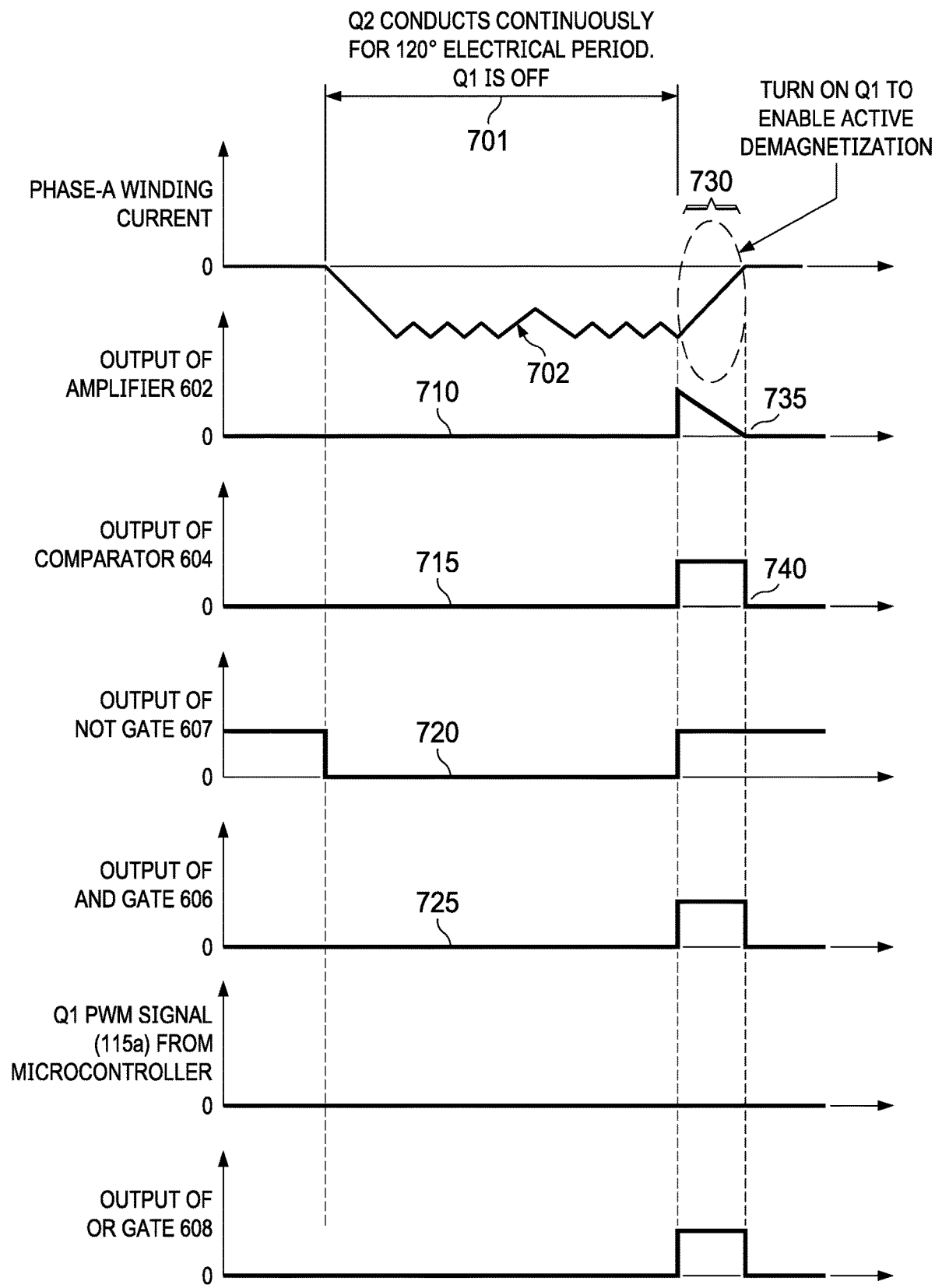
FIG. 7 shows another timing diagram pertaining to the example of FIG. 4.

FIG. 7 includes a timing diagram that illustrates the operation of the circuit of FIG. 6. The signals shown are similar to the signals shown in the timing diagram of FIG. 5, During time period 701, Q2 is on continuously as one of the high side transistors Q3 or Q5 is toggling on and off per corresponding PWM control signals. The current through winding A is negative in this example because the current is flowing in the opposite direction through the winding relative to the example of FIG. 5. Ripple 702 is present on the winding A current as the high side transistors Q3 and Q5 toggle on and off per their respective PWM control signals as explained above.

The output of amplifier 602 is 0 at 710 as no current is flowing through Q1. Accordingly, the output of the comparator also is 0 at 715. The output of NOT gate 607 is 0 at 720 as the digital control signal 115b generated by the MCU 106 for Q2 is logic high. With the NOT gate's output and the comparator's output being logic low, the output of AND gate 606 also is logic low as indicated at 725. Because the digital control signal 115a generated by the MCU 106 for Q1 is logic low and the AND gate's output also is logic low, the output of OR gate 608 is low and thus Q1 is maintained in an off state.

At the start of time period 730, the transistor Q1 is turned on by providing a suitable voltage at G1 (gate of Q1) to turn on Q1, which causes current to flow through Q1 during time period 730. In response, the output of comparator 604 becomes logic high and thus, through AND gate 606 and OR gate 608, the gate driver circuit 610 forces G1 to be actively asserted to keep Q1 in an on state. Q1 is kept on until the current through Q1 falls to 0 as indicated at 735 at which time the comparator's output becomes logic low (740). In turn, the output of AND gate becomes logic low thereby causing G1 to be deasserted thereby turning off Q1, which completes the demagnetization phase of winding A.

As described above, winding A is actively demagnetized through the high and low side power transistors Q1 and Q2 at separate times during each cycle of operation of the motor 110. The same is true for each of the other windings B and C. FIG. 8 shows a table of the various states of operation of the transistors Q1-Q6 by the multiphase gate driver with active demagnetization 102. Rows 802 indicate the states in which a motor winding is being actively demagnetized as described above, and the remaining rows define transistor states in which no winding demagnetization is occurring.

Figure 9:
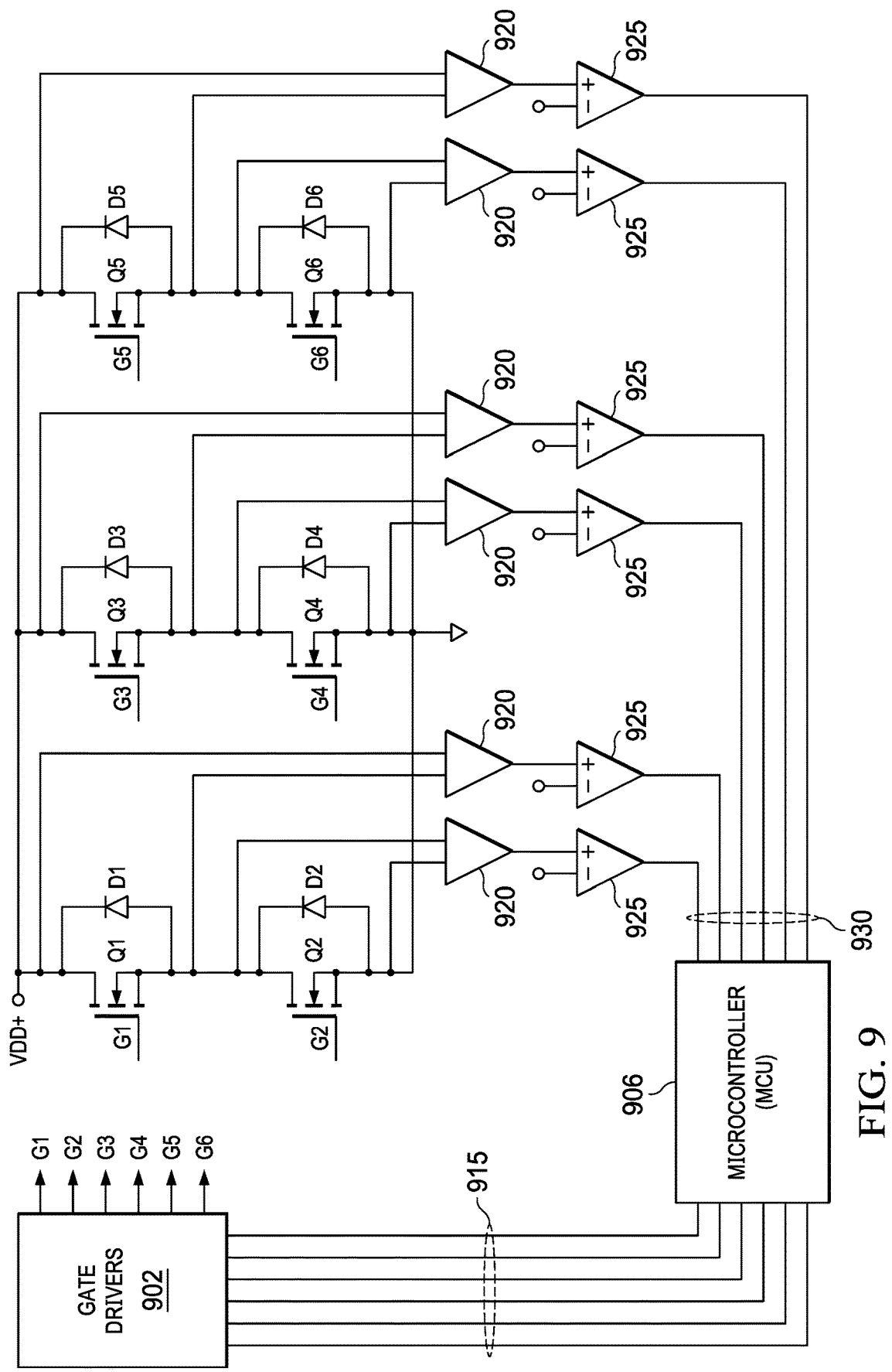
FIG. 9 shows another example of a motor driver that employs active demagnetization.

FIG. 9 provides an example in which the MCU 906 implements active demagnetization of the motor's windings. The motor is not shown in FIG. 9 for simplicity. What is shown is the MCU 906, gate drivers 902, and the low and high side transistors Q1-Q6. The gate drivers 902 in this example comprise transistor circuits that level shift the control signals signal 915 to produce sufficient gate signals G1-G6 to turn the corresponding transistors Q1-Q6 on and off. The MCU 906 determines when to turn on each transistor Q1-Q6 to implement, for example, a trapezoidal control algorithm while also turning certain transistors on and off to demagnetize the motor windings as described above.

For each transistor Q1-Q6, the example of FIG. 9 includes an amplifier 920 coupled to a comparator 925. The functionality of each amplifier 920 and comparator 925 is largely as described above with regard to FIGS. 4 and 6 to provide a signal indicative of whether current is flowing through the corresponding transistor during a demagnetization period of the motor winding connected to that transistor. Thus, the input signals 930 indicate to the MCU 906 whether the current through a particular transistor during active demagnetization of a particular winding has reached zero. The MCU 906 keeps that particular transistor on until its current reaches zero. In another example, the MCU 906 implements a fixed demagnetization period. Such implementations do not necessarily include the amplifiers 920 and comparators 925. The MCU 906 in such examples turns off a transistor performing active demagnetization of a motor winding based on a predetermined amount of time required for the current to fall below a threshold.

Figure 10:
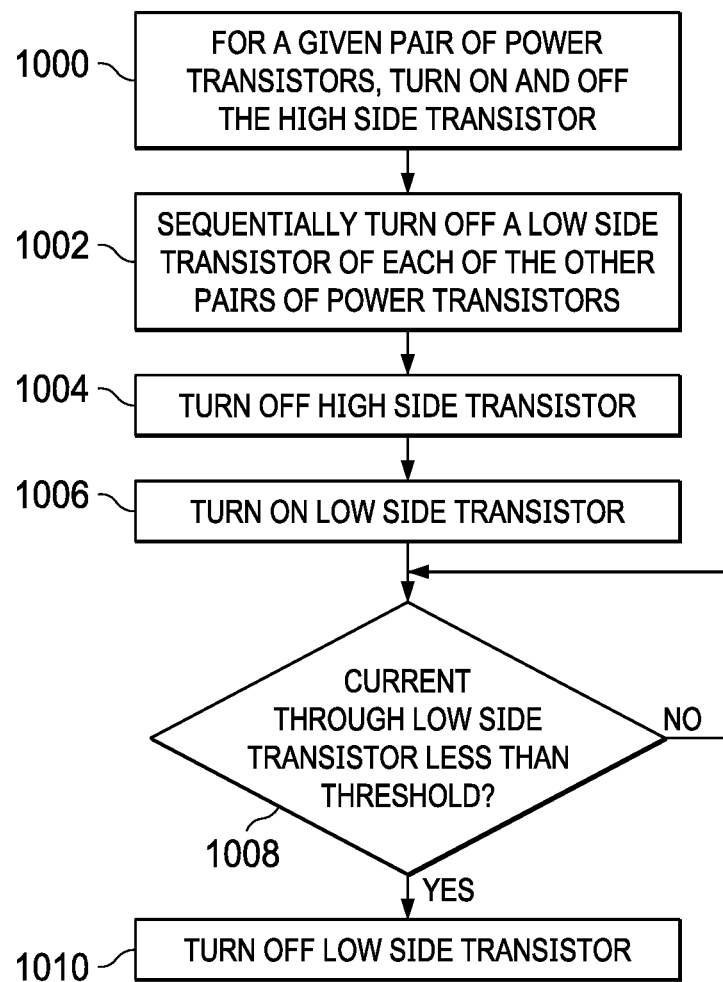
FIG. 10 shows a method flow for actively demagnetizing a motor's windings in accordance with an example.

FIG. 10 provides a flow chart illustrating an example method for actively demagnetizing a winding of a multi-phase motor (e.g., motor 110). The method flow applies to each of the windings. At 1000, the method includes, for a given pair of power transistors among a plurality of pairs of power transistors, with each pair comprising a high side transistor connected to a low side transistor, turning on and off the high side transistor of the given pair. Then, while turning on and off the high side transistor of the given pair, the method includes sequentially turning on the low side transistor of each of the other pairs of power transistors while turning off all other low side transistors. For example, if there are three pairs of high/low side power transistors (as in the example of FIG. 4), then the two low side transistors of the other transistor pairs are turned off one after the other as described above in accordance with the trapezoidal control algorithm.

At 1004, the method includes turning off the high side transistor of the given pair (i.e., the high side transistor turned on/off in operation 1000). Upon turning off that particular high side transistor, the method then includes turning on the low side transistor of that particular pair (1006). At 1008, the method determines whether the current through the low side transistor of the given pair (i.e., the transistor turned on at 1006) falls below a threshold. The current being below the threshold indicates that the energy in the winding connected to that particular transistor pair has dissipated and thus that winding has demagnetized. Once that determination is made (the "yes" branch from 1008), the method includes turning off the low side transistor of the given pair.

Certain terms have been used throughout this description and claims to refer to particular system components. As one skilled in the art will appreciate, different parties may refer to a component by different names. This document does not intend to distinguish between components that differ in name but not function. In this disclosure and claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections. The recitation "based on" is intended to mean "based at least in part on." Therefore, if X is based on Y, X may be a function of Y and any number of other factors.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A motor controller to drive an N-phase motor, comprising:
    a multiphase inverter including a plurality of pairs of high and low side transistors, the high and low side transistors of each pair connected together at a node, and wherein each node of a pair of high and low side transistors is to be coupled to a separate winding of the N-phase motor;
    a multiphase gate driver coupled to the multiphase inverter which includes a current sense amplifier with a differential input coupled to the source and drain of the low side transistor of a given pair, wherein the current sense amplifier is configured to generate a current sense device output signal indicative of the current level through the low side transistor of the given pair, wherein, for each of the N phases, the multi-phase gate driver is to:
        in accordance with a pulse width modulation (PWM) control signal, turn on and off a high side transistor of one of a given pair of high and low side transistors;
        discontinue the PWM control signal to the high side transistor of the given pair and turn off the high side transistor of the given pair; and
        turn on the low side transistor of the given pair until a current level through the low side transistor falls below a threshold, at which time, turn off the low side transistor.

2. The motor controller of claim 1, wherein the multiphase inverter comprises three pairs of high and low side transistors.

3. The motor controller of claim 1, wherein the multiphase gate driver includes a comparator to compare the current sense device output signal to a reference signal to generate a comparator output signal indicative of the current level through the low side transistor of the given pair falling below the threshold.

4. The motor controller of claim 3, wherein the multiphase gate driver includes logic gates coupled to the comparator, wherein the logic gates are to generate a first control signal to cause the low side transistor of the given pair to turn on in response to a second control signal to the high side transistor of the given pair indicating that the high side transistor of the given pair is off and the current through the low side transistor of the given pair is greater than the threshold.

5. The motor controller of claim 4, wherein the logic gates comprise:
    an AND gate coupled to receive the comparator output signal and to receive the second control signal; and
    an OR gate coupled to receive an output of the AND gate and to receive a third control signal coupled to a control input of the low side transistor of the given pair indicative of the low side transistor of the given pair being on or off.

6. The motor controller of claim 1, further including, for each high side transistor and for each low side transistor of each pair:
    a current sensor device coupled to the source and drain terminals of the respective high or low side transistor and configured to generate a current sense device output signal indicative of a current level through the respective transistor;
    a comparator to compare the respective current sense device output signal to a reference signal to generate a comparator output signal indicative of a current level through the respective transistor with respect to the reference signal; and
    a logic circuit to generate a control signal to cause the respective transistor to turn on based on both a control signal indicating that the other transistor of the pair is off and the comparator output signal indicating that the current level is more than a threshold defined by the reference signal.

7. The motor controller of claim 1, further comprising a microcontroller coupled to the multiphase gate driver to generate the PWM control signal.

8. A motor controller to drive an N-phase motor, comprising:
    a multiphase inverter including a plurality of pairs of high and low side transistors, the high and low side transistors of each pair connected together at a node, and wherein each node of a pair of high and low side transistors is to be coupled to a separate winding of the N-phase motor;
    a multiphase gate driver coupled to the multiphase inverter;
    a current sense amplifier with a differential input coupled to the source and drain of the low side transistor of a given pair, and whose output is coupled to a comparator for each of the high and low side transistors to indicate whether current is flowing through the corresponding transistor; and
    a microcontroller coupled to each of the comparator outputs and configured to, for each of the N phases:
        generate control signals to cause the multiphase gate driver to toggle on and off a low side transistor of a given pair of the pairs of high and low side transistors in accordance with a pulse width modulation (PWM) control signal;
        generate a first control signal to cause the multiphase gate driver to turn off the low side transistor of the given pair; and
        generate a second control signal to cause the multiphase gate driver to turn on the high side transistor of the given pair until current through the high side transistor falls below a threshold, at which time, to turn off the high side transistor.

9. The motor controller of claim 8, wherein the multiphase inverter comprises three pairs of high and low side transistors.

10. The motor controller of claim 8, wherein the input of the current sense amplifier is coupled to the source and drain terminals of the high side transistor of the given pair.

11. The motor controller of claim 8, wherein the microcontroller keeps a given transistor on until its current reaches zero.

12. The motor controller of claim 8, wherein the microcontroller keeps a given transistor on for a fixed period of time.

13. A method of controlling a multiphase motor comprising a plurality of windings, comprising:

for a given pair of power transistors among a plurality of pairs of power transistors, each pair comprising a high side transistor connected to a low side transistor, turning on and off the high side transistor of the given pair in accordance with a pulse width modulated (PWM) control signal;

while turning on and off the high side transistor of the given pair, sequentially turning on the low side transistor of each of the other pairs of power transistors while turning off all other low side transistors;

turning off the high side transistor of the given pair;

turning on the low side transistor of the given pair;

determining that current through the low side transistor of the given pair falls below a threshold indicative that energy has dissipated in the corresponding winding of the multiphase motor using a current sense amplifier with a differential input coupled to the source and drain of the low side transistor of the given pair; and responsive to the determination that the current has fallen below the threshold, turning off the low side transistor of the given pair.

\* \* \* \* \*